United States Patent
Jian et al.

(10) Patent No.: US 11,375,373 B2
(45) Date of Patent: Jun. 28, 2022

(54) AUTHORIZATION MANAGEMENT METHOD AND SYSTEM FOR SIGNAL TRANSMISSION BANDWIDTH OF DAS COMMUNICATION SYSTEM

(71) Applicant: SUNWAVE COMMUNICATIONS CO., LTD., Hangzhou (CN)

(72) Inventors: Tuo Jian, Hangzhou (CN); Bin Shen, Hangzhou (CN); Baotian Luo, Hangzhou (CN)

(73) Assignee: SUNWAVE COMMUNICATIONS CO., LTD., Hangzhou (CN)

( * ) Notice: Subject to any disclaimer, the term of this patent is extended or adjusted under 35 U.S.C. 154(b) by 0 days.

(21) Appl. No.: 17/043,694

(22) PCT Filed: Mar. 29, 2019

(86) PCT No.: PCT/CN2019/080326
§ 371 (c)(1),
(2) Date: Sep. 30, 2020

(87) PCT Pub. No.: WO2019/196674
PCT Pub. Date: Oct. 17, 2019

(65) Prior Publication Data
US 2021/0144553 A1    May 13, 2021

(30) Foreign Application Priority Data
Apr. 13, 2018 (CN) .......................... 201810328965.1

(51) Int. Cl.
*H04W 12/08* (2021.01)
*H04W 12/106* (2021.01)
(Continued)

(52) U.S. Cl.
CPC ......... *H04W 12/08* (2013.01); *H04L 41/0896* (2013.01); *H04W 12/069* (2021.01);
(Continued)

(58) Field of Classification Search
CPC . H04W 12/08; H04W 12/106; H04W 12/069; H04W 24/02; H04W 28/20; H04W 88/085; H04W 12/06; H04L 41/0896
See application file for complete search history.

(56) References Cited

U.S. PATENT DOCUMENTS

2017/0019808 A1* 1/2017 Harel .................... H04W 24/04
2018/0343641 A1   11/2018 Smith

FOREIGN PATENT DOCUMENTS

CN       101051909 A    10/2007
CN       101646267 A    2/2010
(Continued)

OTHER PUBLICATIONS

China Office Action of 201810328965.1.
(Continued)

*Primary Examiner* — Mazda Sabouri

(57) ABSTRACT

Disclosed are an authorization management method and system for a signal transmission bandwidth of a DAS communication system. The system consists of an access unit, an extension unit, and a distal unit. The radio frequency access unit is connected to the extension unit. The extension unit is connected to the distal unit. The extension unit mainly implements the extension of a proximal unit port, the extension of a transmission distance, and a transmission bandwidth control function. The distal unit mainly implements the coverage of a radio frequency signal to a specific area. The signal transmission bandwidth of the extension unit is controlled by setting an authorization file formed by authorizing the transmission bandwidth on an extension unit device. When the signal transmission bandwidth configured by a user on the extension unit is not greater than the authorized bandwidth, the configuration becomes effective, and the system performs normal transmission. When the transmission bandwidth configured by the user on the exten- (Continued)

sion unit is greater than the authorized bandwidth, the configuration is limited, the overflow bandwidth is not transmitted, and an abnormal indication is made. The present invention provides a flexible capacity allocation mode for a DAS, which indirectly expands the sales market.

5 Claims, 2 Drawing Sheets

(51) Int. Cl.
*H04W 12/069* (2021.01)
*H04L 41/0896* (2022.01)
*H04W 24/02* (2009.01)
*H04W 28/20* (2009.01)
*H04W 88/08* (2009.01)

(52) U.S. Cl.
CPC ......... *H04W 12/106* (2021.01); *H04W 24/02* (2013.01); *H04W 28/20* (2013.01); *H04W 88/085* (2013.01)

(56) References Cited

FOREIGN PATENT DOCUMENTS

| | | |
|---|---|---|
| CN | 101944956 A | 1/2011 |
| CN | 103117959 A | 5/2013 |
| CN | 106063150 A | 10/2016 |
| CN | 108738020 A | 11/2018 |
| WO | WO2014011832 A1 | 1/2014 |

OTHER PUBLICATIONS

Yang et al. The solution of Multiservice Digital Distributed Access System, section 3 in pp. 6-11, Telecommunications Technology, Dec. 31, 2012.
International Search Report of PCT/CN2019/080326.

* cited by examiner

AUTHORIZATION MANAGEMENT METHOD AND SYSTEM FOR SIGNAL TRANSMISSION BANDWIDTH OF DAS COMMUNICATION SYSTEM

CROSS-REFERENCE TO RELATED APPLICATIONS

This application is a 371 of international PCT patent application PCT/CN2019/080326 filed on Mar. 29, 2019, which claims all benefits to Chinese Patent Application No. 201810328965.1, filed Apr. 13, 2018, the contents of which are hereby incorporated by reference.

TECHNICAL FIELD

The present disclosure relates to the field of indoor coverage of a mobile communication network, and in particular to an authorization management method and system for a signal transmission bandwidth of a distributed antenna system (DAS) communication system.

BACKGROUND

Upon entering into the 4G era, users expect a higher quality mobile network. DAS plays an important role in an optimization solution of indoor network coverage in the 4G era by virtue of stable and safe signal, high spectral efficiency, more effective coverage in a specific occasion and other advantages. The DAS may process multiple frequencies for mixing voice and data. Signals with different standards and different frequencies from base stations of multiple service providers may be accessible to the same set of DAS system, to complete radio coverage of a specific area.

For a coverage system that an operator accesses stage by stage, too much investment in an early stage of construction of a project will undoubtedly increase capital risks. Meanwhile, since it is relatively cumbersome during the construction of the DAS system in the early stage and the construction period is long, cost for project startup is high. There are pressures for some clients with limited capital to invest in the early stage or having small-scale application. Due to the aforementioned problems, sales scope of the DAS system is limited to a certain extent.

SUMMARY

At least some embodiments of the present disclosure provide an authorization management method and system for a signal transmission bandwidth of a DAS communication system, so as at least to partially solve a problem in the related art that since it is relatively cumbersome during the construction of the DAS communication system in the early stage, a construction period is long, and the like, cost for project startup is high accordingly. With the method and the system, a flexible capacity configuration mode is provided to the DAS communication system, and a sales market is indirectly expanded.

In an embodiment of the present disclosure, an authorization management system of a signal transmission bandwidth of a DAS communication system is provided. The DAS communication system includes: an access unit, an expansion unit and a remote unit. The access unit is connected to the expansion unit, and the expansion unit is connected to the remote unit. The expansion unit is configured to expand a port of a near-end unit, extend a transmission distance of the near-end unit and control a transmission bandwidth of the near-end unit. The remote unit is configured to implement coverage of a radio frequency signal on a specific area. The signal transmission bandwidth via the expansion unit is controlled according to an authorization file formed by setting an authorized transmission bandwidth on the expansion unit.

In an optional embodiment, the authorization file is generated according to a device sequence number of the expansion unit and a transmission bandwidth required by a client, and when the authorization file is loaded into this expansion unit by a user, this expansion unit acquires a corresponding authorized transmission bandwidth after verifying that the authorization file is legal.

In an optional embodiment, when the signal transmission bandwidth configured by a user on the expansion unit is not greater than an authorized bandwidth, configuration takes effect, and the authorization management system performs normal transmission; and when the signal transmission bandwidth configured by the user on the expansion unit is greater than the authorized bandwidth, the configuration is restricted, and an overflowing bandwidth is not transmitted, and an abnormal indication is sent.

In an optional embodiment, the expansion unit verifies whether the authorization file is legal through verifying an electronic signature of the authorization file and a matching result between the device sequence number in the authorization file and a sequence number of this expansion unit; and a default authorized bandwidth is reset when the authorization file fails to pass the verification.

In an optional embodiment, a factory configuration of the expansion unit is a default transmission bandwidth, thereby facilitating engineering maintenance and verification. The expansion unit is configured to acquire an authorized bandwidth through upgrading the authorization file.

A method of taking the authorization management system of the signal transmission bandwidth of the DAS communication system of the present disclosure may include the following steps:

at Step S101, generating an authorization file according to a device sequence number of an expansion unit and a transmission bandwidth required by a user;

at Step S102, loading the authorization file into the expansion unit;

at Step S103, parsing the authorization file to extract a digital signature of the authorization file and a sequence number in the authorization file, verifying the digital signature of the authorization file and a matching result between the device sequence number in the authorization file and a sequence number of the expansion unit, when the digital signature is passed the verification and the device sequence number in the authorization file is matched with the sequence number of the expansion unit, extracting authorization information to update an authorized bandwidth, and when the digital signature is not passed the verification or the device sequence number in the authorization file is not matched with the sequence number of the expansion unit, configuring the authorized bandwidth to a factory default;

at Step S104, acquiring a coverage solution configured by the user, and detecting whether a transmission bandwidth configured in the coverage solution exceeds an authorized bandwidth range;

at Step S105, when the transmission bandwidth configured by the user exceeds the authorized bandwidth range, prompting the user to adjust the coverage solution;

at Step S106, determining whether a real time transmission bandwidth exceeds the authorized bandwidth range;

at Step S107, when the real time transmission bandwidth exceeds the authorized bandwidth range, transmitting a signal within the authorized bandwidth range, and discarding to transmit an overflowing part;

at Step S108, when a bandwidth overflowing event occurs, sending an overflow indication;

at Step S109, when the real time transmission bandwidth does not exceed the authorized bandwidth range, transmitting all signals normally; and at Step S110, detecting the real time transmission bandwidth continuously.

The present disclosure implements quantization and subdivision for the signal transmission bandwidth of the DAS system through analyzing requirements of the user, in this way the same set of engineering device may meet different capacity requirements of the client. Interests of a DAS communication system device provider may be protected, and a capital threshold of engineering startup may be appropriately lowered and sales scope may be expanded.

DETAILED DESCRIPTION

The present disclosure will be further described below in combination with drawings and exemplary embodiments.

Figure 1:
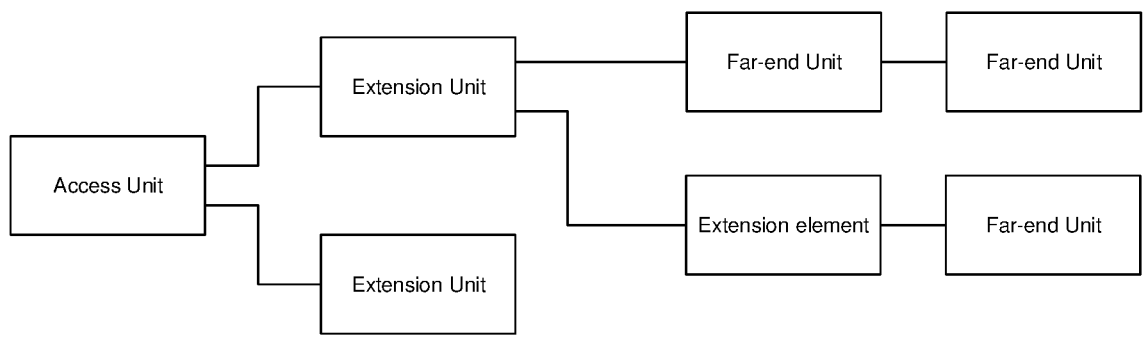
FIG. 1 is a typical application according to an optional embodiment of the present disclosure.

A typical application of the present disclosure is shown in FIG. 1. A DAS communication system includes: an access unit, an expansion unit and a remote unit. A near-end unit is configured to perform at least one of the following operations: access, combination, gain adjustment and other jobs of a radio frequency signal from each operator. The expansion unit is configured to expand a port of a near-end unit, extend a transmission distance of the near-end unit and control a transmission bandwidth of the near-end unit. The remote unit is configured to implement coverage of a radio frequency signal on a specific area. The signal transmission bandwidth via the expansion unit is controlled according to an authorization file formed by setting an authorized transmission bandwidth on the expansion unit. The authorization file is generated according to a device sequence number of an expansion unit and a transmission bandwidth required by a client, and when the authorization file is loaded into this expansion unit, this expansion unit acquires a corresponding authorized transmission bandwidth after verifying that the authorization file is legal.

When the signal transmission bandwidth configured by a user on the expansion unit is not greater than an authorized bandwidth, configuration takes effect, and the authorization management system performs normal transmission; and when the signal transmission bandwidth configured by the user on the expansion unit is greater than the authorized bandwidth, the configuration is restricted, and an overflowing bandwidth is not transmitted, and an abnormal indication is sent. The expansion unit verifies whether the authorization file is legal through verifying an electronic signature of the authorization file and a matching result between the device sequence number in the authorization file and a sequence number of this expansion unit; and a default authorized bandwidth is reset when the authorization file fails to pass the verification. Authorization information is generated according to the device sequence number and capacity of the authorized bandwidth, and the expansion unit is configured to acquire an authorized bandwidth through upgrading the authorization file.

When the DAS communication system takes the authorization management method and system for the signal transmission bandwidth of the present disclosure, the authorization files with different bandwidths will be issued according to need of covering a network to flexibly adapt to application occasions of different scales. A solution of lower cost may be provided to a small-scale application, and a solution meeting the need is available for a large-scale application as well.

Figure 2:
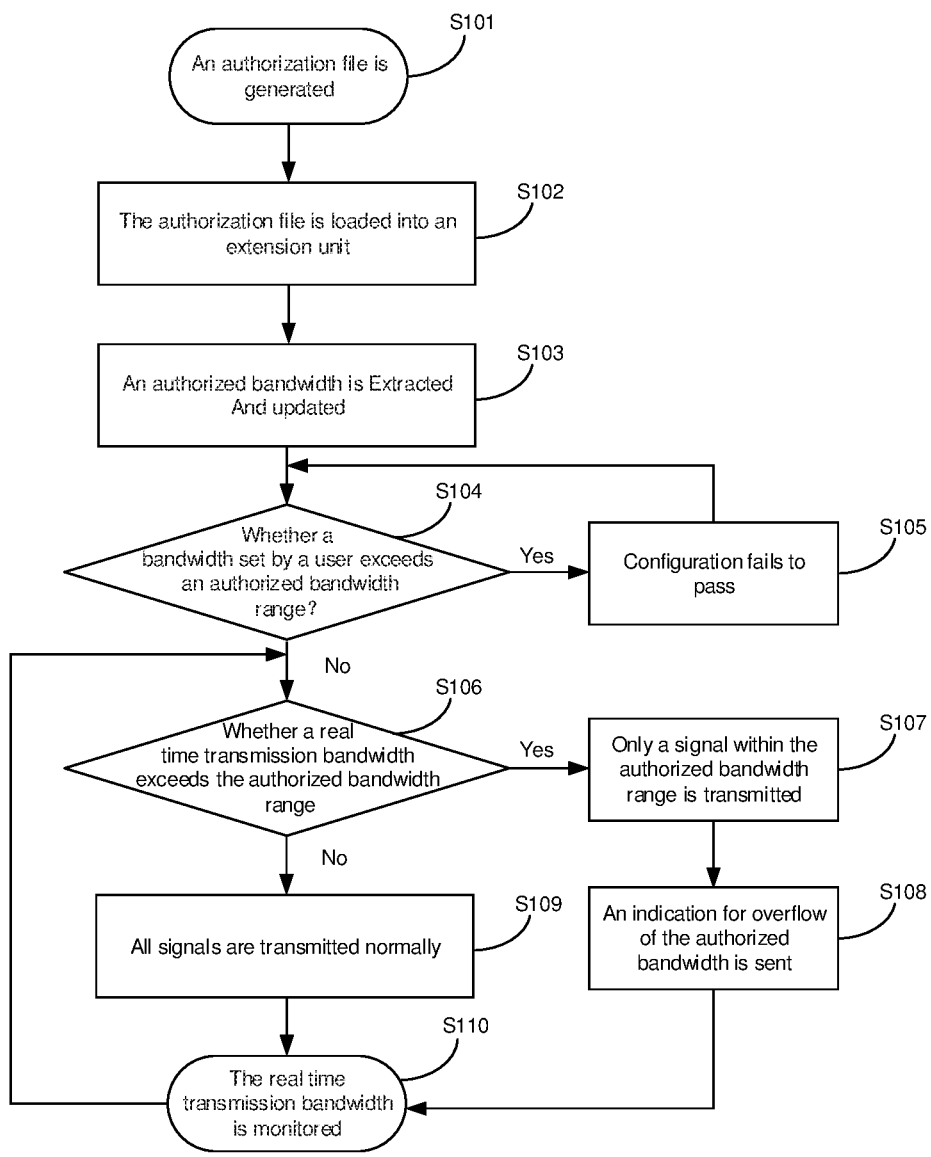
FIG. 2 is a schematic diagram of a using process according to an optional embodiment of the present disclosure.
Figure 3:
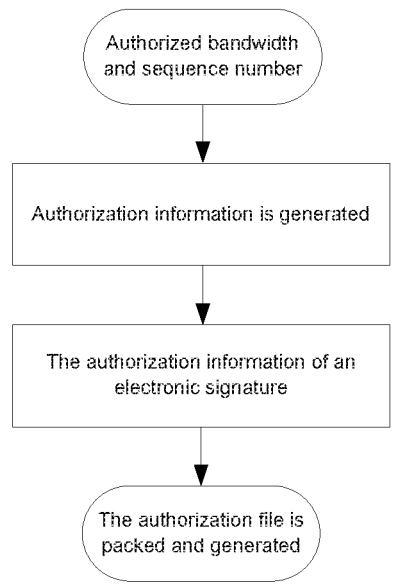
FIG. 3 is a schematic diagram of generation of an authorization file according to an optional embodiment of the present disclosure.

FIG. 2 is an optional embodiment of an authorization management method and system for a signal transmission bandwidth of a distributed antenna system (DAS) communication system provided by the present disclosure, and the optional embodiment may include the following steps.

At Step S101, an authorization file is generated according to a device sequence number of an expansion unit and a transmission bandwidth required by a user.

At Step S102, the authorization file is loaded into the expansion unit.

At Step S103, the expansion unit may parse and authenticate the authorization file to extract authorized information and update the authorized bandwidth.

Figure 4:
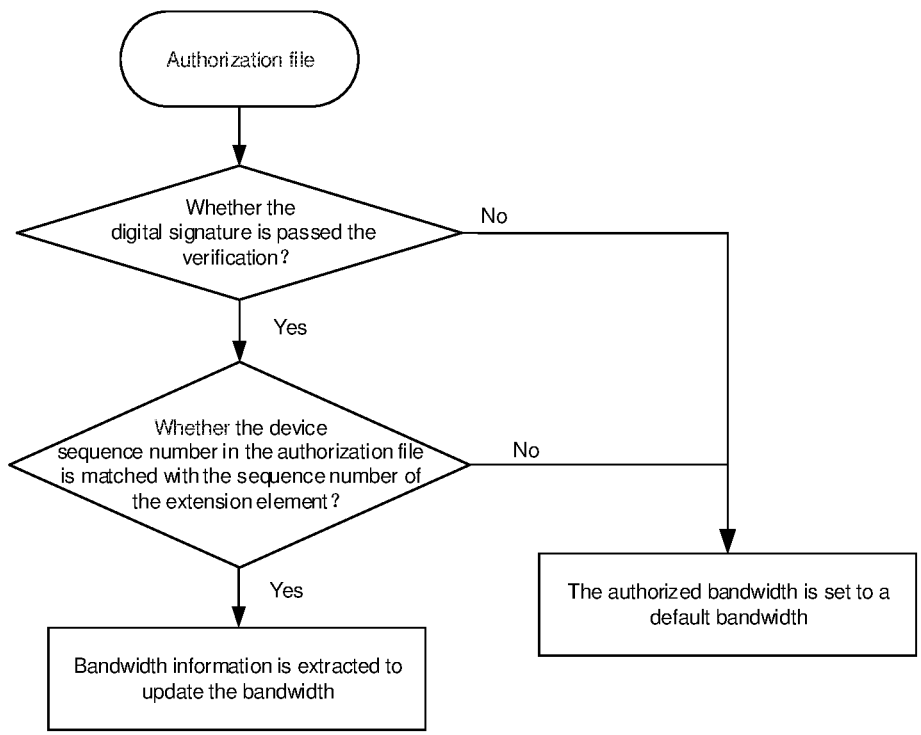
FIG. 4 is a schematic diagram of legality verification of an authorization file according to an optional embodiment.

Specifically, the expansion unit verify the digital signature of the authorization file and a matching result between the device sequence number in the authorization file and a sequence number of the expansion unit. When the digital signature is passed the verification and the device sequence number in the authorization file is matched with the sequence number of the expansion unit, the expansion unit may extract authorization information to update an authorized bandwidth. When the digital signature is not passed the verification or the device sequence number in the authorization file is not matched with the sequence number of the expansion unit, the expansion unit may configure the authorized bandwidth to a factory default. As shown in FIG. 4, a specific verification process is provided.

At Step S104, a user configures a coverage solution, and the expansion unit detects whether a transmission bandwidth configured in the coverage solution exceeds an authorized bandwidth range.

At Step S105, when the transmission bandwidth configured by the user exceeds the authorized bandwidth range, the user is prompted to adjust the coverage solution, and the user needs to adjust the coverage solution.

At Step S106, the expansion unit determines whether a real time transmission bandwidth exceeds the authorized bandwidth range.

At Step S107, when the real time transmission bandwidth exceeds the authorized bandwidth range, the expansion unit may transmit a signal within the authorized bandwidth range, and discard to transmit an overflowing part.

At Step S108, when a bandwidth overflowing event occurs, an overflow indication is sent.

At Step S109, when the real time transmission bandwidth does not exceed the authorized bandwidth range, all signals are transmitted normally.

At Step S110, the real time transmission bandwidth is detected continuously.

The exemplary embodiments of the present disclosure are not intended to constitute limitation to the scope of protection of the present disclosure. Any modifications, equivalent replacements, improvements and the like within the spirit of the present disclosure shall fall within the scope of protection of claims of the present disclosure.

It is understandable that the equivalent replacements or modifications of the technical solutions and inventive concept of the present disclosure made by those skilled in the art should belong to the scope of protection of the claims of the present disclosure.

What is claimed is:

1. A distributed antenna system (DAS) communication system, comprising an access unit, an expansion unit and a remote unit, wherein the access unit is connected to the expansion unit, the expansion unit is connected to the remote unit, the expansion unit is configured to expand a port of the access unit, extend a transmission distance of the access unit and control a transmission bandwidth of the access unit, and the remote unit is configured to implement coverage of a radio frequency signal on a specific area, wherein a signal transmission bandwidth via the expansion unit is controlled according to an authorization file formed by setting an authorized transmission bandwidth on the expansion unit, and wherein the authorization file is generated according to a device sequence number of the expansion unit and a transmission bandwidth required by a client, and when the authorization file is loaded into the expansion unit by a user, this expansion unit acquires a corresponding authorized transmission bandwidth after verifying that the authorization file is legal.

2. The DAS communication system of claim 1, wherein when the signal transmission bandwidth configured by a user on the expansion unit is not greater than an authorized bandwidth, configuration takes effect, and the authorization management system performs normal transmission; and when the signal transmission bandwidth configured by the user on the expansion unit is greater than the authorized bandwidth, the configuration is restricted, and an overflowing bandwidth is not transmitted, and an abnormal indication is sent.

3. The DAS communication system of claim 1, wherein the expansion unit verifies whether the authorization file is legal through verifying an electronic signature of the authorization file and a matching result between the device sequence number in the authorization file and a sequence number of this expansion unit; and a default authorized bandwidth is reset when the authorization file fails to pass the verification.

4. The DAS communication system of claim 1, wherein the expansion unit is configured to acquire an authorized bandwidth through upgrading the authorization file.

5. A method for managing a signal transmission bandwidth of the DAS communication system of claim 1, comprising:

generating an authorization file according to a sequence number of the expansion unit and a transmission bandwidth required by a user;

loading the authorization file into the expansion unit;

parsing, by the expansion unit, the authorization file to extract a digital signature of the authorization file and a device sequence number contained in the authorization file, verifying whether the digital signature of the authorization file has been authenticated and determining whether the device sequence number contained in the authorization file matches the sequence number of the expansion unit, when the digital signature has been authenticated and the device sequence number contained in the authorization file matches the sequence number of the expansion unit, extracting the transmission bandwidth from the authorization file to update the authorized transmission bandwidth of the expansion unit, and when the digital signature has not been authenticated or the device sequence number in the authorization file does not match the sequence number of the expansion unit, setting the authorized transmission bandwidth of the expansion unit to a factory default;

detecting, by the expansion unit, whether a transmission bandwidth configured in a coverage solution configured by the user exceeds the authorized transmission bandwidth;

when the transmission bandwidth configured by the user exceeds the authorized transmission bandwidth, prompting the user to adjust the coverage solution;

determining, by the expansion unit, whether a real time transmission bandwidth exceeds the authorized transmission bandwidth;

when the real time transmission bandwidth exceeds the authorized transmission bandwidth, transmitting a signal within the authorized transmission bandwidth, and discarding an overflowing part;

when a bandwidth overflowing event occurs, sending an overflow indication;

when the real time transmission bandwidth does not exceed the authorized transmission bandwidth, transmitting all signals normally; and detecting the real time transmission bandwidth continuously.

* * * * *